United States Patent [19]

May

[11] 3,752,959

[45] Aug. 14, 1973

[54] PERFORATED TAPE READER

[75] Inventor: Joe C. May, Cheshire, Conn.

[73] Assignee: The Superior Electric Company, Bristol, Conn.

[22] Filed: Dec. 20, 1971

[21] Appl. No.: 209,983

[52] U.S. Cl. .......................... 235/61.11 E, 318/696

[51] Int. Cl. ........................ G05b 19/40, G06k 7/10

[58] Field of Search ............................ 235/61.11 E; 250/219 D, 219 DL; 318/685, 696, 138; 226/8, 120

[56] References Cited

UNITED STATES PATENTS

| | | | |
|---|---|---|---|
| 3,638,028 | 1/1972 | Madsen et al. | 250/219 D |
| 3,523,230 | 8/1970 | York | 318/685 X |
| 3,067,934 | 12/1962 | Amacher et al. | 235/61.11 E |
| 3,328,658 | 6/1967 | Thompson | 318/696 X |
| 3,411,058 | 11/1968 | Madsen et al. | 318/138 |
| 3,466,517 | 9/1969 | Leenhouts | 318/696 X |

*Primary Examiner*—Maynard R. Wilbur
*Assistant Examiner*—Thomas J. Sloyan
*Attorney*—Arthur A. Johnson, Ernest M. Junkins et al.

[57] ABSTRACT

A reader for providing electrical signals using photocells that represents information coded by rows of perforations in tape in which the tape is moved by a stepping motor that accelerates its steps upon starting while decelerating in only two steps to a stop with each stop placing the row of perforations next to be read at the photocells.

8 Claims, 6 Drawing Figures

PERFORATED TAPE READER

In U.S. Patent application Ser. No. 737,399, filed June 17, 1968 now U.S. Pat. No. 3,638,028 and assigned to the assignee of the present invention there is disclosed a punched tape reader that is capable of reading up to 200 rows of perforations per second with accuracy. The tape is moved by a stepping motor which uses four steps to advance the tape from reading one row to reading the next with the motor circuit functioning to stop the tape at any row being read upon command. Though the reader is completely satisfactory within its range of operation, it does not satisfy demands for a reader which is capable of reading more rows or characters per second while still retaining the ability to stop on command after reading any one of the rows.

It is accordingly an object of the present invention to provide a perforated tape reader that is capable of reading a relatively high number of characters per time interval, stop reading upon command without loss of information and utilize a stepping motor for moving the tape.

Another object of the present invention is to achieve the above object with a motor control circuit that accelerates the motor for the first few steps to its normal reading speed and which upon a command to stop, decelerates the motor in only two steps.

A further object of the present invention is to provide a perforated tape reader which though capable of reading characters at a faster rate, is relatively economical to manufacture, durable in use and accurate even over a wide range of tape opaqueness.

In carrying out the present invention, the tape reader includes a stepping motor having a shaft on which a sprocket is fastened with the sprocket having projections that fit into feed holes in the tape to assure positive movement of the tape with the motor. The motor and sprocket are constructed and arranged to require two steps of the motor to move the tape from a position when one row of holes is at the reading photocells to positioning the next row thereat. As the motor moves one step for each change of energization of its windings, a motor control circuit is made to provide two changes of energy each time the reader is commanded to read a row of characters.

The rate of the two changes is dependent upon the frequency of an oscillator, that initially accelerates from a stop in the first few steps, for example 20, to the desired running speed of about 1,000 steps per second in order to read 500 characters per second. Upon being commanded to stop reading, the motor will advance to just the next row by having the oscillator provide the command for the first of the two stopping steps while the last step is delayed a relatively substantial time by having a monostable vibrator provide the control for the last step a fixed time period after the command to cease reading. The fixed time provides a sufficient duration to cause the motor to decelerate to a stop between the next to last and last steps. The tape is thus stopped with the next row of holes at the photocell reading location but the electrical representation thereof is prevented from appearing.

In addition, the circuit not only maintains the motor stopped for a period which assures that it is stopped before it can respond to the next read command but also the circuit senses if the next row is at the reading location and if not produces one step to overcome the improper positioning of the tape. This is achieved by a photocell sensing if the feed hole in the row is at the reading location. Moreover, the feed hole sensing is also used to control the time during reading when the electrical representation of the holes is read out thereby not only permitting the first row to be read when beginning execution of the next reading command but also decreasing the possibility of error during manual reading of the perforations.

Other features and advantages will hereinafter appear.

Figures 4, 5:
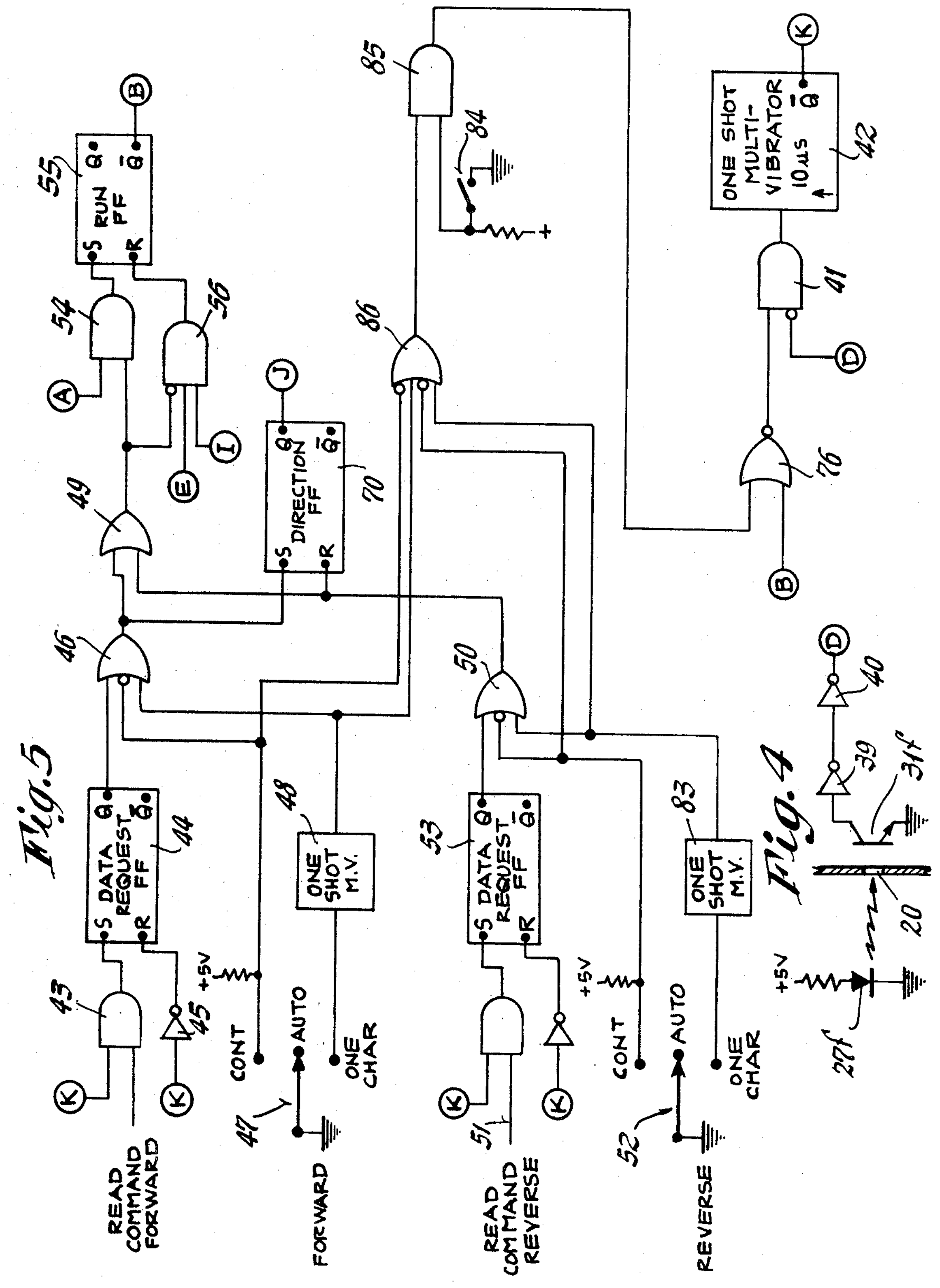
FIG. 4 is an electrical diagram of the components for reading the feed hole in the tape.
Figure 5A:
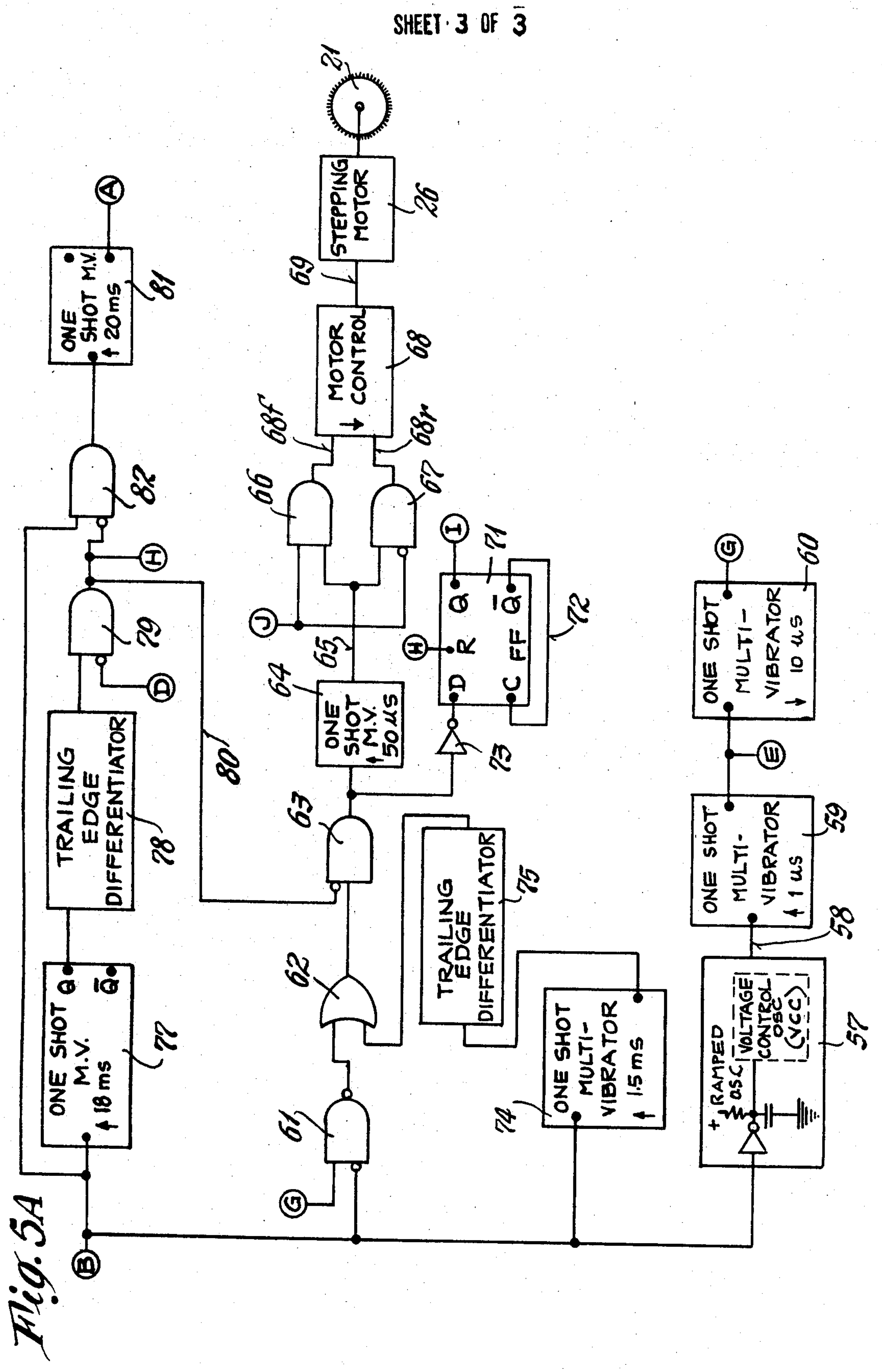

FIGS. 5 and 5A combine to be a block and schematic diagram of the motor drive circuit for moving the tape.

Referring to the drawing, the tape reader is generally indicated by the reference numeral 10 and includes a flat front panel 11 on which a fixed support 12 is mounted. A block 13 is mounted for movement towards and away from the upper surface of the support 12 by means of a slot 14 and screw 15. The support and block when abutting define therebetween a longitudinal channel 16 through which a perforated tape 17 may pass. If desired, reels and/or tape compartments may be positioned on the panel 11 to contain the tape.

The tape 17 is of conventional perforated design and includes rows 18 (FIG. 2) that extend transversely of its length with there normally being areas for eight holes 19 to be perforated in the tape with such holes being information holes while each row also has a feed hole of somewhat smaller configuration generally indicated by the reference numeral 20 and located in the row as shown. The distribution in the areas of holes 19 or "no holes" for each row normally define the information for one character.

Figure 1:
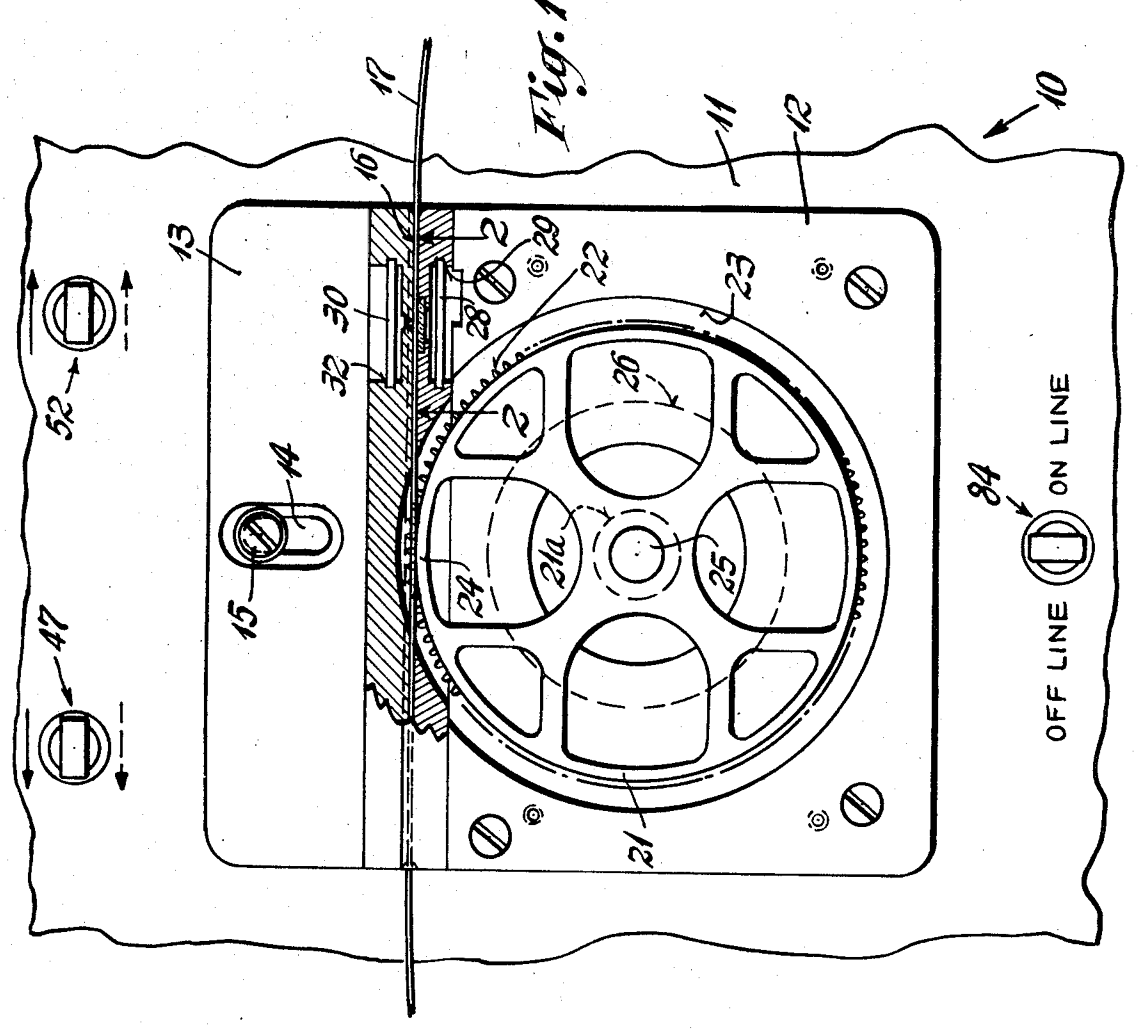
FIG. 1 is a front view of the tape reader of the present invention shown partly in section.

Referring to FIG. 1, the reader 10 includes a sprocket 21 having a periphery on which pins 22 project positioned within an arcuate cutout 23 formed in the support 12. The upper periphery of the sprocket 21 indicated, by reference numeral 24, extends through a slot formed in the top surface of the block 12 such that the pins 22 thereat extend into the channel 16 to engage the feed holes 20. In this manner, rotation of the sprocket 21 effects longitudinal movement of the tape 17 within the channel 16.

The sprocket 21 has a hub 21a which is made fast to a shaft 25 of a stepping motor 26. The stepping motor may be of the type shown in U.S. Pat. No. Re25,445 assigned to the assignee of the present invention. It will be understood that with such a motor, the stator poles and rotor teeth determine the number of steps per revolution and that in the present embodiment, the motor is made to have 200 discrete steps per revolution, though, of course, other numbers of steps per revolution may be employed if so desired. With 200 steps per revolution and with 100 pins on the sprocket 21, the motor, as will hereafter be more fully explained, is made to step two steps for each movement of the tape that constitutes the distance between adjacent rows 18 to advance the tape from one row to the next. The pins 22 have the same distance therebetween as the feed holes 20.

The reader 10 provides an electrical representation of the presence or absence of a hole 19 in each of the eight areas and the feed hole of a row through the use of nine light emitting diodes 27 aligned on an insulating board 28 that is positioned within a slot 29 formed in support 12.

Figure 2:
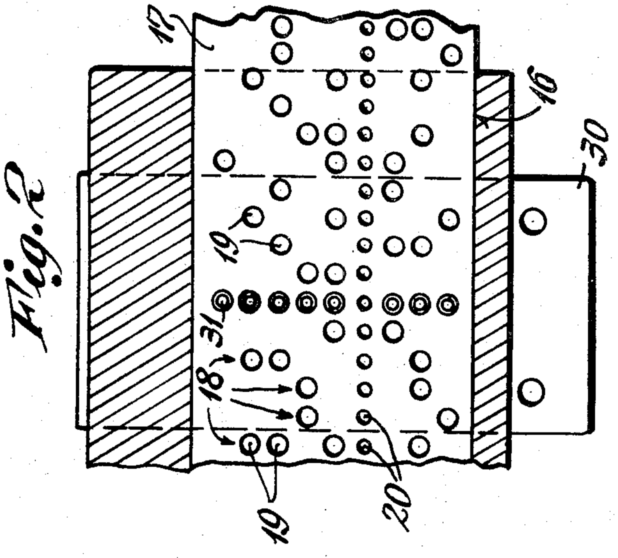
FIG. 2 is an enlarged view taken on the line 2—2 of FIG. 1.

Opposite the diodes 27 is a board 30 having nine photocells 31 mounted thereon with the board 30 being located in a slot 32 formed in the movable block 13 and with apertures or openings extending from the diodes and photocells into the channel 16. It will be understood that there are nine diodes and nine photocells each mounted opposite each other and the disposition thereof is such that as shown in FIG. 2, they extend transversely of the tape to be aligned with a row 18 such that each photocell is capable of sensing the presence or absence of a hole opposite thereto.

Figure 3:
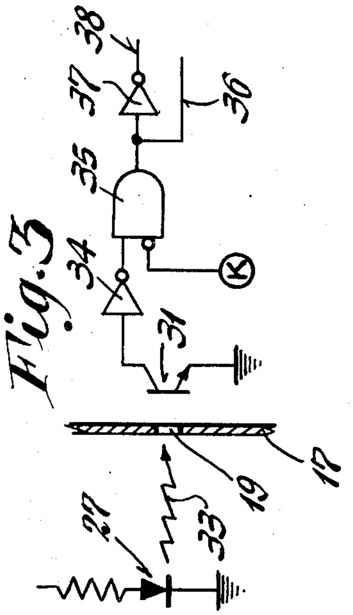
FIG. 3 is an electrical diagram of the components for reading one of the information holes in a row.

Referring to FIG. 3, a light emitting diode 27 is shown together with a portion of the tape 17 having an information hole 19 formed therein positioned between the diode 27 and its associated photocell 31 so that light, as indicated by the jagged arrow 33 may pass from the diode 27 through the information hole to the photocell 31. The photocell 31 upon receiving light decreases its resistance to produce a low voltage as the input to an inverter 34 which in turn provides a high voltage at an input of an AND gate 35. Another input to the AND gate 35 is connected to a terminal K while the output of the gate 35 may be used directly by means of a lead 36 or may be inverted by an inverter 37 and appear inversely on a lead 38. It will be understood that there is a circuit such as the circuit shown in FIG. 3 for each of the eight photocells 31 that are sensitive to an information hole area in each row. The voltage level on the leads 36 and 38 constitutes electrical representations of a character as represented by the holes in each row 18 and these electrical representations may be used in subsequent information processing machinery. Thus with a hole present the lead 36 will have a high +voltage level thereon while the lead 38 will have a low or zero voltage while in the absence of a hole, the reverse voltage levels will be present.

As used herein, reference to an AND gate is employed and includes both AND and NAND gates while reference to OR gates may also include NOR gates. Additionally, a high voltage level may be also referred to by a logic symbol 1 while a low voltage may be referred to as a logic symbol 0. All gates are depicted according to conventional logic diagrammatic representations wherein a circle may be employed to indicate an inversion of a voltage or the change from one logic symbol to the other.

Shown in FIG. 4 is a circuit for producing at a terminal D a logic 1 upon the feed hole photocell 31*f* receiving light from its associated light emitting diode 27*f*, through a feed hole 20 in the tape. The activation of the cell 31*f* is amplified by a pair of series connected inverting amplifiers 39 and 40 with the latter having its output connected to the terminal D. Thus, whenever a feed hole 20 is positioned between the light source 27*f* and the feed hole photocell 31*f*, the terminal D has a high voltage while in the absence of a hole the terminal D has a low voltage or logical 0. It will be appreciated that the feed hole 20, as shown in FIG. 2, is of a smaller size than the information holes 19 and thus the terminal D becomes a logical 1 just for essentially the complete positioning of the feed hole 20 between the source 27*f* and the cell 31*f*.

The information on the terminal D is employed to control the presence of the electrical representation on the output leads 36 and 38 by controlling the voltage on the terminal K. Thus, referring to the lower right hand portion of FIG. 5, the terminal D supplies an input to an AND gate 41 which if when a 0 is present on the other gate 41 input, produces a 1 on the output of the gate 41 to a one-shot multi-vibrator 42 having an output terminal $\overline{Q}$ that is connected to the terminal K. The one-shot multi-vibrator 42 has a duration of ten micro-seconds and is activated by the leading edge of a voltage change on its input from 0 to 1 so that as soon as the output of the gate 41 shifts from 0 to 1, the terminal K will shift to 0 for 10 micro-seconds and then revert back to a logical 1.

It will be understood that the terminal D is 1 only for essentially the time that the feed hole is positioned between the source 27*f* and cell 31*f* and thus terminal K is made to be a logical 0 only for 10 micro-seconds each time this occurs. As terminal K is an input to the gate 35 (in FIG. 3) it only permits this gate to conduct information for each photocell for 10 micro-seconds with the time being set by the occurrence of the feed hole of a row over the photocell 31*f*. Any information hole 19 will thus move to be located between its diode and photocell at the time that terminal D is activated to a logic 1 level and accordingly the photocells can only provide their electrical representation when they are physically aligned with an information hole and even then only for the extremely limited period of time as set by the one-shot 42. Moreover, the reading of the holes will occur only once for every feed hole and requires the actual sensing of the feed hole prior to the short reading time.

The reading of the feed hole is also utilized to control the energization of the stepping motor 26 to take two steps to position the next row 18 beneath the photocells 31. Thus referring again to FIG. 5, the terminal K is connected to be one input to an AND gate 43 having another input connected to a terminal denoted "read command." The latter terminal may be connected to equipment utilizing the information on the leads 36 and 38 and will provide a high voltage or logical 1 on this terminal whenever the tape reader 10 is commanded to produce electrical information. If instead a logical 0 is on this terminal, then the tape reader is commanded by the exterior equipment to stop reading the tape.

The output of the gate 43 is connected to the S terminal of a data request bistable flip-flop 44 having an output terminal Q which is a 1 whenever terminal S is a 1. In addition, terminal K, through an inverter 45 is connected to the R terminal and causes the flip-flop 44 to assume a state where its terminal Q is a 0 whenever K is a 0. Thus the flip-flop 44 assuming a read command of a logic 1 has Q equal to 0 only for the instant when K is 0, which is for ten micro-seconds as heretofore set forth.

The terminal Q of flip-flop 44 is connected as one input of an OR gate 46 having another input connected to a contact marked CONT of a switch 47 and a third input connected to a one-shot 48 that has its input connected to another contact marked ONE CHAR of switch 47. The switch 47 is shown in FIG. 1 and is a three position switch with the switch when positioned at its AUTO contact being ineffective to control the motor while if connected to its contact CONT effects continual advancement of the tape. If it is connected to its ONE CHAR contact the switch 47 provides an instruction through the one-shot multivibrator 48 to have the tape advance just one row or character.

The output of the OR gate 46 constitutes one of the inputs to an OR gate 49 which also receives as another input, the output of an OR gate 50. The gate 50 functions similarly to the gate 46 except that it controls movement of the tape in a reverse direction upon receiving a read command from a terminal 51 to move the tape in the opposite direction than that which the read command terminal connected to the gate 43 directs. In addition, a switch 52 may be used to manually control the tape either for continuous operation or for one character movement with the switch 52 being identical as to continuous or one character movement of the tape as is the switch 47. It would also be understood that terminal K is connected to the data request flip-flop 53 but that this flip-flop is rendered inactive unless a logic 1 is supplied on the read command. Thus the present tape reader is capable of either automatically or manually moving the tape forwardly or reversely either continuously or for just one character.

The output of the gate 49 when either of its inputs is a logic 1 which occurs, whenever the movement to the next character is desired, constitutes an input to an AND gate 54 whose output is connected to the terminal S of a bistable, run flip-flop 55. The terminal A, as will be hereinafter explained, during reading is normally a logic 1 when it is desired to read the tape so that the flip-flop 55 is set to have its terminal $\overline{Q}$ a logic O whenever a logic 1 voltage is applied to its terminal S. If a logic 1 is applied to its R terminal, which is connected to the output of an AND gate 56 then the flip-flop 55 terminal $\overline{Q}$ is a logic O. The AND gate 56 has one of its inputs connected to the output of the OR gate 49 and its other inputs connected to terminals E and I.

The state of the run flip-flop 55 through the terminal B is used to control operation of a ramped oscillator 57 (FIG.5A) which includes a voltage controlled oscillator (VCC), an RC network and an inverter such that when a logical 0 voltage is applied to the inverter it becomes a positive voltage to the RC network which increases the control voltage with time to the voltage control oscillator to increase the frequency of the pulses appearing on the oscillator output lead 58. Preferably the oscillator 57 is set to have a maximum pulse frequency of 1,000 steps per second in order to enable reading of 500 characters per second.

Each pulse on the lead 58 is shaped by a one-shot pulse shaper 59 to appear as a positive going voltage spike which is directed to a terminal E and also to the input of a one-shot 60. The one-shot 60 is set to provide on its output, terminal G, a pulse of 10 micro-seconds duration with the pulse beginning on the trailing edge of the pulse from the one-shot 59 which in turn may be 1 micro-second after the appearance of the pulse on the lead 58.

The terminal G is connected as an input to an AND gate 61 with the other input thereto being connected inversely to the terminal B such that when the positive pulse at G coincides with the terminal B being a logic 0, the output of the gate 61 is a logical 0 which is an input to an OR gate 62. In the absence of a logic 0 pulse on its other input, the gate 62 will pass the pulse from the terminal G to an input of an AND gate 63 which if not inhibited by its other input will pass the pulse to a one-shot multi-vibrator 64 having a 50 micro-second duration and which is triggered on the leading edge of a change from a logic 0 to 1. The one-shot 64 is shifted to its unstable state with the leading edge of the pulse from the gate 63 and retains this state for 50 micro-seconds when it delivers a logical 0 to 1 voltage change on its output lead 65 to a pair of AND gates 66 and 67.

The pulse will pass through one of the AND gates to a motor control 68 which is of the type that accepts an input pulse on either its forward channel **68*f* or its reverse channel 68*r* and provides over a lead 69 a change in energization to the stepping motor 26. Each pulse delivered to the motor control 68 will result in the stepping motor 26** having the energization of its windings changed to produce one step of the motor and hence movement of the tape one half the distance between rows.

The ramped oscillator 57 will continue to supply pulses so long as the run flip-flop 55 is in its set state ($B = 0$) and these pulses will increase in frequency from the beginning to the desired value. As the motor is being stepped, each sensing of a feed hole by the cell **31*f* will provide the electrical representation of the information holes in the row on the output leads 36 and 38 with the information only being present substantially for ten micro-seconds as set by the one-shot 42** and terminal K.

The direction of movement of the stepping motor is controlled by the voltage value at a terminal J which is obtained from a bistable direction flip-flop 70 having a terminal Q. The terminal S of the flip-flop 70 is connected to the output of the OR gate 46 and will be a logic 1 whenever the read command to the AND gate 43 is a logic 1 or the switch 47 is connected to either its CONT contact or its ONE CHAR contact which in turn will cause the terminal J to be a logic 1. With terminal J a logic 1 a pulse input to the gate 66 will make both its inputs alike, and hence the pulse will pass on to the forward channel **68*f* while the gate 67 will be inhibited from passing a pulse. If the read command is on the lead 51 or the switch 52 is set to either its CONT contact or its ONE CHAR contact then the terminal S of flip-flop 70 will be a logic 0 while terminal R will be a 1 and this in turn causes terminal J to be logic 0 which effects inhibiting of pulse passage through the gate 66 while enabling pulse passage through the gate 67 to the reverse motor channel 68*r*** and hence a reverse movement of the motor. In either instance, the motor steps one step for each pulse.

Upon the tape reader being instructed to stop reading by the read command terminal shifting from logic 1 to 0 or by the switches 47 or 52 being changed, the motor will take two steps before stopping on the next feed hole. The first step results from a pulse from the ramped oscillator 57 to the terminal G. A second pulse is applied to the motor control 68 after a delay of about 1.5 milli-seconds, so that the second pulse is in effect at a much slower rate than the previous pulse and hence serves to effectively brake the motor at the end of its step. To this end, assuming that the forward read command changes from a logic 1 to 0 indicating that reading is to cease, the data request flip-flop 44 will remain with $Q = 1$ until the character is read and terminal K goes to 0 for 10 micro-seconds. The data request flip-flop assumes the R energized state wherein $Q = 0$ which causes the output of gates 46 and 49 to become logic 0 and the high voltage is removed from the terminal S of the run flip-flop 55. However, the run flip-flop 55 maintains $\overline{Q}$ energized (and terminal $B=0$) until a high voltage or logic 1 is received from the output of gate 56 to the R terminal thereof. This occurs when terminal E is a logic 1 which as it is connected to the output of pulse shaper 59 exists for only a micro-second or so after each pulse produced by the oscillator 57 and also when terminal I is a 1. Terminal I is connected to the output Q of a delay type flip-flop 71 which has its other terminal $\overline{Q}$ connected to its input C by a lead 72 while its input D is connected through an inverter 73 to the output of gate 63. The terminal I by such connections is a logic 0 for each even pulse while the feed hole is sensed on each odd pulse. Accordingly, terminal I remains a logic 0 for the first pulse through the gate 63 after both the commands to stop reading the feed hole is sensed, and then shifts to a logic 1. Thus terminals E and I being a 1, gate 56 produces a 1 to the terminal R of the run flip-flop 55 shifting it and terminal B to a logic 1.

The ramped oscillator 57 is stopped by this logic change on terminal B as is the gate 61 and thus the next pulse from the oscillator is prevented from being passed through the gate 61 to the motor control. For the second pulse, a one-shot 74 becomes unstable by the terminal B going from 0 to 1 and produces a pulse of 1.5 milli-seconds duration with the change. The trailing edge of this pulse is sensed by a trailing edge differentiator 75 which produces a 1 to an input of the OR gate 62 the other input being 0 and accordingly the pulse will pass through the gate 63 to the motor control 68. However, it will be understood that the introduction of 1.5 milli-seconds by the one-shot 74 makes the last pulse substantially spaced in time from the duration that had been existing between the pulses for 1,000 steps per second and accordingly effectively decelerates the motor such that it is capable of stopping at the step determined by the pulse from the one-shot 74.

The stop position of the tape is with the next row of holes located beneath the photocells from the row when the stop signal appears and in order to prevent reading of this row, the gate 76, which has an output that provides an input to the gate 41 is changed to a logic 1 by reason of terminal B, now being a logic 1 so that the gate 76 now has inputs of 0 and 1 which after inversion produces a 1 input to the gate 41. The gate 41 will thus inhibit the reading of the feed hole when terminal D is a logic 1 from activating the one-shot 42 which in turn prevents terminal K from becoming a 0.

The present circuit also functions to determine if the tape has stopped with a row of characters over the photocells to assure that the tape and motor control are in synchronism by means of a circuit that includes a one-shot 77 which is triggered to on by the terminal B going from logical 0 to 1 for a period of about 18 milli-seconds. A trailing edge differentiator 78 receives the output from the one-shot 77 and on the negative going portion thereof (i.e., the trailing edge of the 18 milli-second pulse) produces a short pulse of perhaps one tenth of a micro-second as an input to an AND gate 79. The other input to the AND gate 79 is the terminal D voltage, which, when on a feed hole is a 1 so that if the tape is stopped correctly on a feed hole, the gate 79 will produce a logic 0 output which when introduced as an input to AND gate 63, produces no effect. On the other hand, if terminal D has a low voltage, indicating that a feed hole is not positioned over the photocell **31*f* a step must be taken. Thus gate 79 will pass a logic 1 pulse on a lead 80 to the gate 63 which in turn will pass the pulse through the one-shot 64 to the motor control 68** to advance the motor one step. After this step, the tape will have come to rest over the feed hole.

In addition, the output of the AND gate 79 is connected by terminal H to the reset terminal (R) of flip-flop 71 and assures that it will be conditioned so that Q (and terminal I) is properly set at a logical 0 for the next movement.

Also by the present motor control circuit, the motor is prevented from moving the tape for perhaps 20 milli-seconds if a read command should occur before the expiration of this time in order to assure that the motor comes fully to rest. This is achieved by use of a one-shot 81 having its input connected to an AND gate 82 one of whose inputs is connected to the terminal B while its other input is connected to the output of the AND gate 79. Accordingly, as soon as terminal B changes its voltage from a logic 0 to 1 and as at this time, the output of AND gate 79 is a logic 0 but inverted to a logic 1, the one-shot 81 is actuated and will produce a signal on the terminal A connected to its $\overline{Q}$ terminal which is a logic 0. This signal is applied as an input to the gate 54 and remains for the 20 milli-second period to inhibit applying a logic 1 to the S terminal of the run flip-flop 55 to change the state of the terminal B.

With the next read command after the motor rest delay, it will be understood that the reader 10 reads the row of characters beneath its photocell before producing movement of the tape. This is effected by terminal B being a logic 1, terminal D being a 1 as the feed hole is over its photocell **31*f* and thus for 10 micro-seconds terminal K is a logic 0 to effect reading. During this time even though the ramped oscillator has been actuated, the motor is delayed by not only the delay in the oscillator 57 which may take 50 milli-seconds to produce the first pulse but also by the fifty micro-second one-shot 64** and thus the motor will not move until after reading of the first row has been effected.

If it is desired to operate the motor manually in the forward direction as by positioning of switch 47 to be in contact with its CONT contact, a logic 1 becomes an input to the gate 46 and this in turn will function the same as if the read command was a logic 1 with the exception that there will be no 10 micro-second change in signal each time a character is read. Moreover, if the switch 47 is made to engage the contact designated ONE CHAR, the motor will take two steps by first the one-shot 48 producing a short duration pulse which changes terminal B to a logic 1 producing the pulse for the first step from the oscillator while the second pulse is obtained through the one-shot 74. The one-shot 48 has an unstable duration which is less than the time to produce the first step.

The manual reverse switch 52 functions in the same way as the switch 47 except that it uses the output of the gate 50 instead of that of the gate 46 as the controlling input to the gate 49, to cause the motor to run continuously in the reverse direction. For the one character movement, the operation is the same for the two steps, i.e., using the ramped oscillator for the first pulse and the one-shot 74 for the second pulse.

The reader of the present invention enables a user to select if there is to be a reading of the information on the leads 36 and 38 through the use of a switch 84. The switch 84 is connected between ground and an input to an AND gate 85 such that in the closed position of the switch where reading is prevented, logic 0 is applied as an input to the gate 85. The other input to the gate 85 is the output of an OR gate 86 which has four inputs connected to the four contacts of switches 47 and 52. When these switches are in their AUTO position, the gate 86 supplies a logic 1 as the other input to the gate 85 while if they are engaging any other contact, the gate 86 has a logic 0 output. With read command reading and the switch 84 open, the gate 85 has two 1 inputs providing a logic 1 output to the gate 76. As terminal B is also 1, the output of gate 76 is a 0 which when terminal D is a logic 1, enables reading out of the information. If switch 84 is closed, the output of gate 85 is a logic 0 and the output of gate 76 is a logic 1 so that gate 41 inhibits operation of the one-shot 42. Moreover, the gate 86 prevents reading when the tape is being moved under manual control by producing a logic 0 to the input of gate 85 which with a logic 1 on its other terminal from switch 84 being open again produces a logic 0 to gate 76 and effects inhibiting of the gate 41.

The use of the information in terminal K to control the state of the data request flip-flop 44 assures that the command to run will not effect a starting of the motor until the information in the row at the photocells occurs. The gate 56 assures that the oscillator will be stopped after an even motor pulse (when the reader reads on an odd pulse) thereby providing the second last motor pulse irrespective of when the stop command occurs.

From the foregoing it will be appreciated that there has been disclosed a reader for reading perforated tape to supply electrical representation of information coded on the tape. The reader has a stepping motor to move the tape and by using two steps to move the tape the length between rows the tape may be mOved accurately quite fast but yet retain the ability to stop at the next row upon command. Specifically the motor when starting, accelerates for the first few steps to its normal running speed and upon a command to stop, takes the first step at this speed but the applying of the energization for the second step is delayed sufficiently to assure that the motor will step and stop at the last energization.

Variations and modifications may be made within the scope of the claims and portions of the improvements may be used without others.

I claim:

1. A reader for providing electrical representations of information coded in perforations formed in transverse rows in a tape with each row having a feed hole comprising a support, means on the support defining a channel through which the tape is longitudinally movable, a row of photocells positioned transversely of the channel at a reading location with there being one photocell for each position in a row where a code perforation could be formed and a photocell for sensing the presence of a feed hole, means connected to the photocells for providing an electrical representation upon the sensing of a perforation at the reading station and for providing a signal indicating the sensing of a feed hole at the reading location, a stepping motor having a shaft mounted on the support and taking a step for each change of energization supplied thereto, a sprocket mounted on the shaft and having a periphery formed with projections capable of mating with the feed holes and with a portion of the periphery extending into the channel, said motor and sprocket being constructed and arranged to move the tape in two steps of the motor from having one row at the reading position to having the next row thereat, a motor control circuit for providing changes of energization to the motor including a ramped oscillator means for providing an increasing rate of changes upon starting to a normal maximum running rate, and means for stopping the motor with two changes of energization to position the next row of perforations at the reading location, said stopping means including means for enabling the supplying of one change at the normal running rate from the oscillator means and one change means for supplying the second change with the time interval between the first and second change being greater than the time interval between changes at the normal maximum running rate whereby the motor stops at the position dictated by the second change.

2. The invention as defined in claim 1 in which there are means for preventing the appearance of the electrical representation of the next row of perforations at the reading location after the command to cease reading.

3. The invention as defined in claim 1 in which there are means for enabling the appearance of the electrical representations only for a short duration after a feed hole signal appears, in which the motor circuit provides a first change of energization upon being directed to move the tape and in which there are means for delaying said change at least for the short duration in which the appearance of the electrical rep-resentations is enabled.

4. The invention as defined in claim 1 in which there are means for providing an additional change of energization to the motor with the absence of a feed hole signal occurring after the second change.

5. The invention as defined in claim 1 in which the motor control circuit includes a flip-flop having alternate states for each motor change with one state occurring for odd changes and the other state occurring for even changes and means for setting the state of the flip-flop to the one state irrespective of its state after the occurrence of the second change.

6. The invention as defined in claim 1 in which the means for stopping the motor includes a flip-flop having a first state for odd changes and a second state for even changes and in which the first state of the flip-flop enables only the first change to be supplied by the ramped oscillator means after the receipt of a command to cease reading.

7. The invention as defined in claim 1 in which the motor control circuit includes means for preventing further changes after a command to cease reading for a determined period after the second change to the motor to assure that the motor has fully stopped in response to the command to cease reading.

8. The invention as defined in claim 1 in which the one change means provides a constant time interval between the first and second change.

* * * * *